United States Patent [19]
Koch

[11] Patent Number: 5,471,934
[45] Date of Patent: Dec. 5, 1995

[54] BELLOWS AS A PASSAGE PROTECTION DEVICE FOR ARTICULATED VEHICLES

[75] Inventor: Robert Koch, Bad Sooden-Allendorf, Germany

[73] Assignee: Hubner Gummi - und Kunststoff GmbH, Germany

[21] Appl. No.: 339,119

[22] Filed: Nov. 14, 1994

[30] Foreign Application Priority Data

Nov. 13, 1993 [DE] Germany .................. 43 38 857.4

[51] Int. Cl.⁶ .................. B60D 5/00; B60D 17/22
[52] U.S. Cl. .................. 105/18; 105/8.1; 280/403
[58] Field of Search .................. 105/8.1, 15, 18, 105/19, 20; 280/403

[56] References Cited

U.S. PATENT DOCUMENTS

| | | | |
|---|---|---|---|
| 1,178,909 | 4/1916 | Fisher | 105/18 |
| 1,500,591 | 7/1924 | Morton | 105/18 |
| 1,586,812 | 6/1926 | Klos | 105/18 |
| 2,419,044 | 4/1947 | Wendland | 105/18 |

Primary Examiner—Robert J. Oberleitner
Assistant Examiner—Kevin D. Rutherford
Attorney, Agent, or Firm—Levine & Mandelbaum

[57] ABSTRACT

A bellows has integral connecting members joining the side wall and floor or roof fabricated from a sheet of flexible material with displaced longitudinal folds having adjacent seams to form a tongue and a pocket for receiving the tongue when the sections are pivoted with respect to one another.

10 Claims, 1 Drawing Sheet

BELLOWS AS A PASSAGE PROTECTION DEVICE FOR ARTICULATED VEHICLES

BACKGROUND OF THE INVENTION

A preferred use of correspondingly dimensioned bellows is the protection of the passage area between two vehicles coupled with one another in an articulated manner. If two rail-borne or road vehicles coupled with one another in an articulated manner are used for passenger traffic, a passage device, which permits persons to pass over from one vehicle to the other, is commonly provided between the vehicles. To make possible such passage from one vehicle to the other without exposure to adverse environmental effects, such a passage device is surrounded with a passage protection device, and this passage protection device is frequently a bellows, in which a plurality of folded webs of fabric following one another in the longitudinal direction of the vehicles form, due to being connected to one another along the longitudinal edges, a tube which is closed all around and is connected to the front wall of one of the two vehicles at one end, and to the rear wall of the other of the two vehicles at the other end.

Such bellows have been generally known and frequently used; they are proven passage protection devices, which guarantee reliable protection for persons passing over between the vehicles for a long time; but they hardly hinder the relative movements between the vehicles, which are necessary for the travel of the vehicle.

In such a bellows, the roof, the side walls and the floor are assembly units manufactured separately, which are fitted together at the mutually corresponding edges to form the tube with a rectangular cross section. Particular attention must be paid to the transition areas between the side walls and the roof as well as between the side walls and the floor from the viewpoint that they shall define the contour of the bellows, on the one hand, but, on the other hand, they should not lead to any undesired stiffening of the bellows, nor hinder the mobility of the vehicles in relation to one another. In addition to this viewpoint, there arises the problem of special risks, be it due to rotting or to the risk of damage by external effects. If the side walls and the floor are fitted together, the connection device is particularly at risk.

SUMMARY OF THE INVENTION

The present invention is based on a bellows in which each web of fabric extends in one piece over the respective transition area between a side wall of the bellows and the floor of the bellows, and its task is to characterize a bellows in which the transition area in each web of the bellows is prepared by a special folding technique such that it optimally satisfies the requirements imposed.

The features of such a bellows become apparent from the claims, which are explained below with reference to the drawing bellows.

DESCRIPTION OF THE PREFERRED EMBODIMENT

Figure 1:
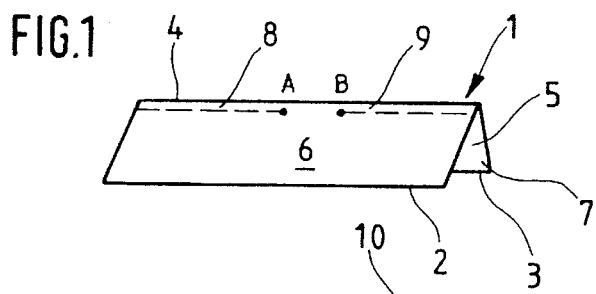
FIGS. 1–3 show three consecutive sections during the preparation of a fold, which passes over the transition area between a side wall and the floor of the bellows, and which can be seen as a plurality of folds as they follow one another in the longitudinal direction of the tube formed by the bellows.

The preparation of a bellows according to the present invention begins, for each fold, with an initially flat material web 1, which is folded in the shape of a peaked roof, so that two outer material web longitudinal edges 2, 3 and one ridge edge 4 are formed, wherein the two fold panels 5, 6 extend from the ridge edge 4 to one of the fold longitudinal edges 2 and 3, respectively, forming a fold angle 7. A seam is prepared in the area of the ridge edge 4, and the seam consists of two sections 8 and 9, whose end points facing each other are located at a predetermined distance from one another and are designated by A and B. The seam section 8 adjoining point A will be located in the floor area of the finished bellows, and the seam section 9 adjoining point B will be located in the area of a side wall of the finished bellows. The preparation of a seam is the preferred method in practice, but this shall not exclude other manners of fastening; bonding and stitching are examples of equivalent techniques.

Figure 2:
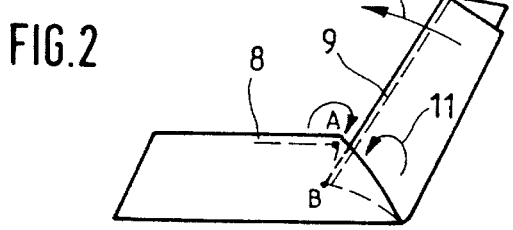

The next step in the preparation of a bellows according to the present invention, explained on the basis of a single fold, is shown in FIG. 2 as the pivoting of the material web section adjoining point B with the seam section 9 in the direction of arrow 10, wherein the fabric web section designated by point B protrudes, in the manner of a tongue, into a pocket-shaped section of the material web section designated by point A (arrow 11), and an overlapping with a radius is formed.

A respective clamping frame 12 and 13, which is at the same time used to connect the nearest material web, not shown, to the material web shown, is now placed on each of the outer material web longitudinal edges 2, 3.

Figure 3:
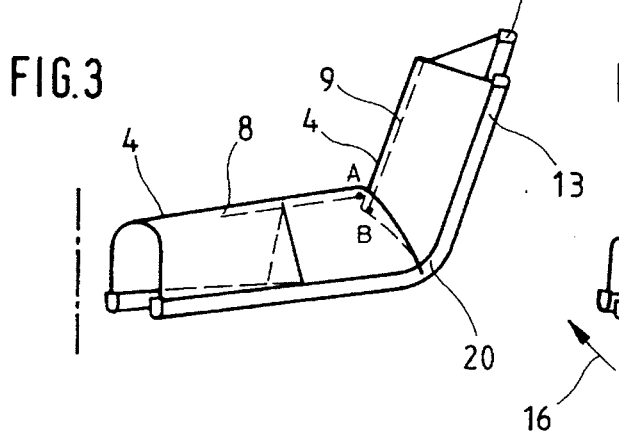

The seam section 8 is relatively short, and the section of the material web, which now forms a section of the floor of the bellows, has the shape of a peaked roof in this area only, and the adjoining part of the material web assumes, according to FIG. 3, the shape of a groove, which has an approximately semicircular cross section, is open to the outside, and is grasped by a respective frame 12 and 13 at the two longitudinal edges.

In contrast, the seam section 9 is as long as the material web section adjoining point B, so that the material web section adjoining point B has a groove with a triangular cross section, which is open to the outside, between the frames 12, 13 over its entire length.

As can be seen, the floor of the bellows passes over on the inside into the side wall of the bellows, while this transition is arch-shaped on the outside.

The design of the bellows is consequently characterized in that the seams and overlaps are placed during the folding such that the transitions between the folds and overlaps roll relative to one another when the folds are pulled apart or pushed together during rotary movement around the vertical axis (FIGS. 1 through 3 for the movement process during the manufacture). The distances between the fold seams and overlaps are selected to be such that the extension of the side fold and that of the floor fold are identical. This means maximum extension.

Figure 4:
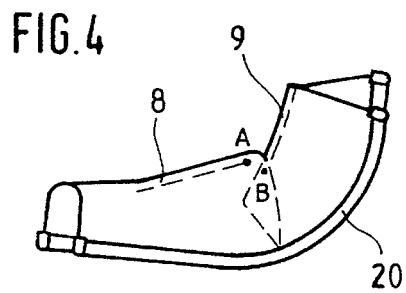
FIGS. 4–6 show movement processes taking place in the area of a transition area formed by folding between the floor of the bellows and a side wall of the bellows.
Figure 5:
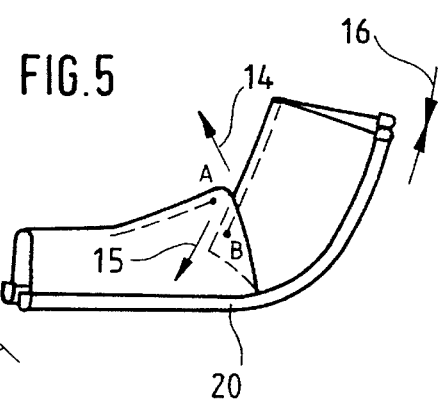
Figure 6:
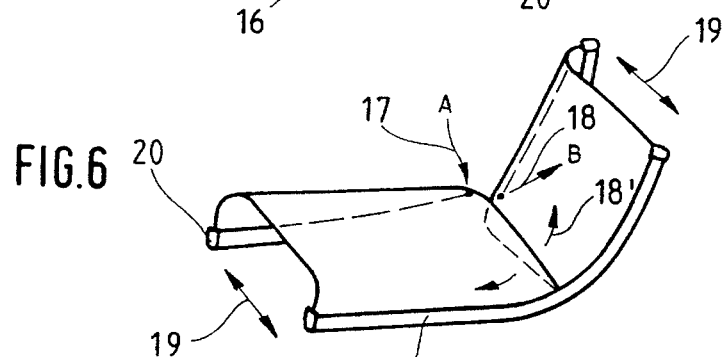

The movement process in the bellows during corresponding movements of the vehicle are now explained on the basis of FIGS. 4–6, again based on the example of a fold of the bellows consisting of a plurality of such folds.

During straight-line travel of the articulated vehicle, which is preferably an articulated bus for road traffic, i.e., trackless travel, even though this is not a prerequisite according to the present invention, the folds have the shape according to FIG. 4, which is the shape shown in FIG. 3.

When the vehicle is traveling in a curve, the situation according to FIG. 5 arises for the transition area inside the curve between the floor and the side wall that is on the inside of the curve. Point A is moving upward (arrow 14), and point B is correspondingly moving downward (arrow 15); in addition, it is moving into the pocket formed in the floor of the bellows, and the overlap is "rolling in." The two frames 12, 13 approach each other in the same manner (double arrows 16).

At the same time, the situation according to FIG. 6 arises for the transition area on the outside of the curve between the floor and the side wall located on the outside of the curve. Point A is moving downward (arrow 17), while point B is moving upward and outward (arrows 18, 18'). The overlap is "rolling up." The two frames 12, 13 are moving away from one another (double arrows 19).

Figure 7:
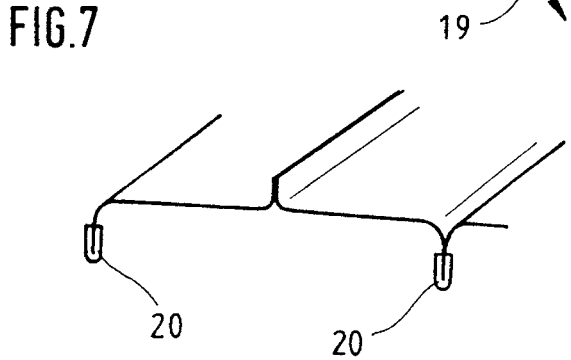
FIG. 7 shows a fold cross section for additional explanation of the present invention.

The folding of the corner areas is designed such that the fabric, i.e., the material web, can be used completely, i.e., up to 100%, for the extension in the side (free fabric), as is shown in FIG. 7.

Figure 8:
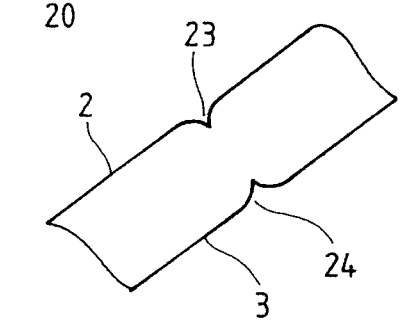
FIG. 8 shows a fabric corner cut.

The radius 20 in the area of the transition of the frames 12, 13 between the floor area 21 of the bellows and the wall area 22 of the bellows is facilitated by the design of the corner cut according to FIG. 8. The fabric or material web has symmetrical, groove-like incisions 23, 24 from the side edges 2, 3 in the area between the points A and B.

As was mentioned above, a plurality of material webs are fitted together, as was shown and described, in the frame 12, 13 to form a tube of rectangular cross section, and the end frames at the two ends of the bellows are designed to be such that each of the two ends can be attached to one of the two vehicles connected to one another in an articulated manner.

What is claimed is:

1. Bellows as a passage protection means between two vehicles connected to one another in an articulated manner, wherein a plurality of folds follow each other in the longitudinal direction of the bellows forming a tunnel that is closed all around, and two outer fold edges of one fold are grasped in a frame, and fold walls extending obliquely inwardly from the outer fold edges converge in an inner edge, which is approximately the apex line of an arc, characterized in that in each transition area between one of the bellows side walls and the bellows floor, the area of the inner edge (4) is characterized by a fixing seam (8, 9); that this seam consists of two seam sections (8 and 9) located at spaced locations from one another in the longitudinal direction of the seam; and that the transition between the floor of the bellows and the respective side wall of the bellows is formed by pivoting the bellows material from an initial single plane into two planes that are at right angles to one another, wherein the area between the seam sections forms the range of pivoting, so that the beginning (A) of one seam section (8) defines the floor, the beginning (B) of the other seam section (9), which faces that seam section, defines the side wall, and the side wall part located closest to the floor of the bellows protrudes, in the manner of a tongue, into a pocket formed by the floor part located closest to the side wall of the bellows.

2. Bellows in accordance with claim 1, characterized by such a distance between the seam sections (8, 9) and by such an extent of the tongue-like penetration of the bellows side wall into the pocket of the floor of the bellows that the extension of the side wall fold and that of the floor fold are identical.

3. Bellows in accordance with claim 1, characterized in that during a change in the position of the two side walls of the bellows in relation to one another around the vertical axis of the bellows and the associated extension of the folds of one side wall of the bellows (increase in the angle between the fold walls) and folding together of the folds of the other side wall of the bellows (reduction in the angle between the fold walls), the tongue-like side wall parts roll within the pocket-like floor parts.

4. Bellows in accordance with claim 1, characterized in that the material web has groove-shaped incisions from both side edges of the bellows, symmetrically between the seam sections, before being pivoted into two planes that are mutually at right angles to one another and in the smooth state (the angle between the fold walls equals 180°).

5. Bellows in accordance with claim 1, characterized in that two adjacent bellows side wall edges of two consecutive folds are held in a common frame.

6. A bellows for protecting a passageway between two vehicles connected in an articulated manner, said bellows being flexible for assuming straight and curved positions, and comprising two side walls, at least one transverse wall spanning said side walls, and connecting means integral with one of said side walls and said transverse wall for joining said side wall and transverse wall, said connecting means comprising an elongated sheet of flexible material having opposite edges, a first section integral with said side wall, a second section longitudinally displaced from said first section and integral with the said transverse wall of said bellows, and a third section intermediate said first and second sections, each of said first and second sections having a longitudinal fold along a length thereof for forming two panels within each of said first and second sections, first fastening means connecting the panels within said first section adjacent the fold of said first section for forming a tongue on said first section, second fastening means connecting the panels within said second section adjacent the fold of said second section for forming a pocket within said second section, said first section being pivotal relative to said second section at said third section whereby said tongue is received in said pocket.

7. A bellows according to claim 6 wherein the distance between the edges of the first section is equal to the distance between the edges of the second section when the bellows is in a straight disposition.

8. A bellows according to claim 6 wherein the degree of penetration of said tongue into said pocket varies with the degree of curvature of said bellows.

9. A bellows according to claim 6 said connecting means has opposing notches formed in the edges at said third section.

10. A bellows according to claim 6 wherein said bellows has a plurality of said connecting means disposed along the length thereof and further comprising a plurality of frame means, each frame means receiving the edges of adjacent panels of respective connecting means for joining said connecting means.

* * * * *